(12) United States Patent
Noureddine et al.

(10) Patent No.: US 7,831,720 B1
(45) Date of Patent: Nov. 9, 2010

(54) FULL OFFLOAD OF STATEFUL CONNECTIONS, WITH PARTIAL CONNECTION OFFLOAD

(75) Inventors: Wael Noureddine, Mountain View, CA (US); Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 203 days.

(21) Appl. No.: 12/122,570

(22) Filed: May 16, 2008

Related U.S. Application Data (60) Provisional application No. 60/938,640, filed on May 17, 2007.

(51) Int. Cl.
  *G06F 15/173* (2006.01)
(52) U.S. Cl. .................. 709/227; 709/228; 370/395
(58) Field of Classification Search .................. 709/227
  See application file for complete search history.

(56) References Cited

U.S. PATENT DOCUMENTS

| | | | |
|---|---|---|---|
| 4,445,116 A | 4/1984 | Grow | |
| 4,533,996 A | 8/1985 | Hartung et al. | |
| 5,497,476 A | 3/1996 | Oldfield et al. | |
| 5,778,189 A | 7/1998 | Kimura et al. | |
| 6,087,581 A | 7/2000 | Emmer et al. | |
| 6,226,680 B1 | 5/2001 | Boucher et al. | |
| 6,240,094 B1 | 5/2001 | Schneider | |
| 6,247,060 B1 | 6/2001 | Boucher et al. | |
| 6,334,153 B2 | 12/2001 | Boucher et al. | |
| 6,389,479 B1 | 5/2002 | Boucher et al. | |
| 6,393,487 B2 | 5/2002 | Boucher et al. | |
| 6,397,316 B2 | 5/2002 | Fesas, Jr. | |
| 6,401,177 B1 | 6/2002 | Koike | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,470,415 B1 | 10/2002 | Starr et al. | |
| 6,510,164 B1 | 1/2003 | Ramaswamy et al. | |
| 6,564,267 B1 * | 5/2003 | Lindsay | 709/250 |

(Continued)

OTHER PUBLICATIONS

Clark et al., "*An Analysis of TCP Processing Overhead,*" IEEE Communications Magazine, Jun. 1989, pp. 23-29.

(Continued)

*Primary Examiner*—Wing F Chan
*Assistant Examiner*—Razu A Miah
(74) *Attorney, Agent, or Firm*—Beyer Law Group LLP (57) ABSTRACT

A method of operating a system including a host and intelligent network interface circuitry extends a passive open operation to accomplish full offload of a stateful connection between a host and a peer. In response to observing a synchronization signal from the peer, an offload target creates a connection control block in the offload target in anticipation of a corresponding stateful connection being offloaded from the host. The observed synchronization signal is allowed to be provided to the host. In response to observing a synchronization acknowledgment signal from the host and destined for the peer, the offload target performs establishment processing for the stateful connection. Based on an acknowledgment of the synchronization acknowledgment signal from the peer, acknowledgement of the synchronization acknowledgement signal is processed and a corresponding acknowledgment signal is provided to the host. In response to receiving an offload event indication from the host, the stateful connection is operated between the host and the peer.

11 Claims, 6 Drawing Sheets

U.S. PATENT DOCUMENTS

| | | | |
|---|---|---|---|
| 6,591,302 | B2 | 7/2003 | Boucher et al. |
| 6,594,268 | B1 | 7/2003 | Aukia et al. |
| 6,625,671 | B1 | 9/2003 | Collette et al. |
| 6,658,480 | B2 | 12/2003 | Boucher et al. |
| 6,681,244 | B1 | 1/2004 | Cross et al. |
| 6,687,758 | B2 | 2/2004 | Craft et al. |
| 6,697,868 | B2 | 2/2004 | Craft et al. |
| 6,701,372 | B2 | 3/2004 | Yano et al. |
| 6,708,223 | B1 | 3/2004 | Wang et al. |
| 6,708,232 | B2 | 3/2004 | Obara |
| 6,717,946 | B1 | 4/2004 | Hariguchi et al. |
| 6,751,665 | B2 | 6/2004 | Philbrick et al. |
| 6,757,245 | B1 | 6/2004 | Kuusinen et al. |
| 6,757,746 | B2 | 6/2004 | Boucher et al. |
| 6,792,502 | B1 | 9/2004 | Pandya et al. |
| 6,798,743 | B1 | 9/2004 | Ma et al. |
| 6,807,581 | B1 | 10/2004 | Starr et al. |
| 6,813,652 | B2 | 11/2004 | Stadler et al. |
| 6,862,648 | B2 | 3/2005 | Yatziv |
| 6,925,055 | B1 | 8/2005 | Erimli et al. |
| 6,938,092 | B2 | 8/2005 | Burns |
| 6,941,386 | B2 | 9/2005 | Craft et al. |
| 6,965,941 | B2 | 11/2005 | Boucher et al. |
| 6,996,070 | B2 | 2/2006 | Starr et al. |
| 7,031,267 | B2 | 4/2006 | Krumel |
| 7,042,898 | B2 | 5/2006 | Blightman et al. |
| 7,076,568 | B2 | 7/2006 | Philbrick et al. |
| 7,089,326 | B2 | 8/2006 | Boucher et al. |
| 7,093,099 | B2 | 8/2006 | Bodas et al. |
| 7,114,096 | B2 | 9/2006 | Freimuth et al. |
| 7,124,205 | B2 | 10/2006 | Craft et al. |
| 7,133,902 | B2 | 11/2006 | Saha et al. |
| 7,133,914 | B1 | 11/2006 | Holbrook |
| 7,133,940 | B2 | 11/2006 | Blightman et al. |
| 7,164,656 | B2 | 1/2007 | Foster et al. |
| 7,167,926 | B1 | 1/2007 | Boucher et al. |
| 7,167,927 | B2 | 1/2007 | Philbrick et al. |
| 7,174,393 | B2 | 2/2007 | Boucher et al. |
| 7,185,266 | B2 | 2/2007 | Blightman et al. |
| 7,191,241 | B2 | 3/2007 | Boucher et al. |
| 7,191,318 | B2 | 3/2007 | Tripathy et al. |
| 7,239,642 | B1 | 7/2007 | Chinn et al. |
| 7,254,637 | B2 | 8/2007 | Pinkerton et al. |
| 7,260,631 | B1 | 8/2007 | Johnson et al. |
| 7,284,047 | B2 | 10/2007 | Barham et al. |
| 7,313,623 | B2 | 12/2007 | Elzur et al. |
| 7,376,147 | B2 | 5/2008 | Seto et al. |
| 7,408,906 | B2 | 8/2008 | Griswold et al. |
| 7,453,892 | B2 | 11/2008 | Buskirk et al. |
| 7,474,670 | B2 | 1/2009 | Nowshadi |
| 7,493,427 | B2 | 2/2009 | Freimuth et al. |
| 7,533,176 | B2 * | 5/2009 | Freimuth et al. ............ 709/227 |
| 7,583,596 | B1 | 9/2009 | Frink |
| 7,609,696 | B2 * | 10/2009 | Guygyi et al. .............. 370/394 |
| 2001/0010046 | A1 | 7/2001 | Muyres et al. |
| 2001/0021949 | A1 | 9/2001 | Blightman et al. |
| 2002/0039366 | A1 | 4/2002 | Sano |
| 2002/0191622 | A1 | 12/2002 | Zdan |
| 2003/0018516 | A1 | 1/2003 | Ayala et al. |
| 2003/0035436 | A1 | 2/2003 | Denecheau et al. |
| 2003/0046330 | A1 * | 3/2003 | Hayes ........................ 709/201 |
| 2003/0158906 | A1 * | 8/2003 | Hayes ........................ 709/211 |
| 2003/0200284 | A1 | 10/2003 | Philbrick et al. |
| 2003/0204631 | A1 | 10/2003 | Pinkerton et al. |
| 2004/0003094 | A1 | 1/2004 | See |
| 2004/0019689 | A1 | 1/2004 | Fan |
| 2004/0028069 | A1 | 2/2004 | Tindal et al. |
| 2004/0030745 | A1 | 2/2004 | Boucher et al. |
| 2004/0042487 | A1 | 3/2004 | Ossman |
| 2004/0054813 | A1 | 3/2004 | Boucher et al. |
| 2004/0062245 | A1 | 4/2004 | Sharp et al. |
| 2004/0062246 | A1 | 4/2004 | Boucher et al. |
| 2004/0064578 | A1 | 4/2004 | Boucher et al. |
| 2004/0064590 | A1 | 4/2004 | Starr et al. |
| 2004/0073703 | A1 | 4/2004 | Boucher et al. |
| 2004/0078480 | A1 | 4/2004 | Boucher et al. |
| 2004/0088262 | A1 | 5/2004 | Boucher et al. |
| 2004/0100952 | A1 | 5/2004 | Boucher et al. |
| 2004/0111535 | A1 | 6/2004 | Boucher et al. |
| 2004/0117509 | A1 * | 6/2004 | Craft et al. .................. 709/250 |
| 2004/0158640 | A1 | 8/2004 | Philbrick et al. |
| 2004/0165592 | A1 | 8/2004 | Chen et al. |
| 2004/0190533 | A1 | 9/2004 | Modi et al. |
| 2004/0199808 | A1 | 10/2004 | Freimuth et al. |
| 2004/0213235 | A1 | 10/2004 | Marshall et al. |
| 2004/0240435 | A1 | 12/2004 | Craft et al. |
| 2005/0071490 | A1 | 3/2005 | Craft et al. |
| 2005/0083935 | A1 | 4/2005 | Kounavis et al. |
| 2005/0120037 | A1 | 6/2005 | Maruyama et al. |
| 2005/0125195 | A1 | 6/2005 | Brendel |
| 2005/0135378 | A1 | 6/2005 | Rabie et al. |
| 2005/0135396 | A1 | 6/2005 | McDaniel et al. |
| 2005/0135412 | A1 | 6/2005 | Fan |
| 2005/0147126 | A1 | 7/2005 | Qiu et al. |
| 2005/0190787 | A1 | 9/2005 | Kuik et al. |
| 2005/0216597 | A1 * | 9/2005 | Shah et al. .................. 709/230 |
| 2005/0259644 | A1 | 11/2005 | Huitema et al. |
| 2005/0259678 | A1 | 11/2005 | Gaur |
| 2005/0289246 | A1 | 12/2005 | Easton et al. |
| 2006/0031524 | A1 * | 2/2006 | Freimuth et al. ............ 709/227 |
| 2006/0039413 | A1 | 2/2006 | Nakajima et al. |
| 2006/0075119 | A1 | 4/2006 | Hussain et al. |
| 2006/0080733 | A1 | 4/2006 | Khosmood et al. |
| 2006/0133267 | A1 | 6/2006 | Alex et al. |
| 2006/0168649 | A1 | 7/2006 | Venkat et al. |
| 2006/0206300 | A1 | 9/2006 | Garg et al. |
| 2006/0209693 | A1 | 9/2006 | Davari et al. |
| 2006/0221946 | A1 | 10/2006 | Shalev et al. |
| 2006/0235977 | A1 * | 10/2006 | Wunderlich et al. ......... 709/227 |
| 2006/0281451 | A1 | 12/2006 | Zur |
| 2007/0011358 | A1 | 1/2007 | Wiegert et al. |
| 2007/0064737 | A1 | 3/2007 | Williams |
| 2007/0070901 | A1 | 3/2007 | Aloni et al. |
| 2007/0083638 | A1 * | 4/2007 | Pinkerton et al. ........... 709/224 |
| 2007/0110436 | A1 | 5/2007 | Bennett |
| 2007/0201474 | A1 | 8/2007 | Isobe |
| 2008/0002731 | A1 | 1/2008 | Tripathi et al. |
| 2008/0016511 | A1 | 1/2008 | Hyder et al. |
| 2008/0043750 | A1 | 2/2008 | Keels et al. |
| 2008/0232386 | A1 | 9/2008 | Gorti et al. |

OTHER PUBLICATIONS

Woodside et al., "*The Protocol Bypass Concept for High Speed OSI Data Transfer*," Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf.

Rütsche et al., "*TCP/IP on the Parallel Protocol Engine*," High Performace Networking, (IV, C-14), Elsevier Science Publishers, B.V. North Holland 1993.

Thia et al., "*High-Speed OSI Protocol Bypass Algorithm with Window Flow Control*," IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture*," Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems*," IFIP Transactions; vol. C-23 archive, Proceedings of the IFIP TC6 International Conference on Information Networks and Data Communication table of contents, pp. 217-230, Year of Publication: 1994.

Dalton et al., "*Afterburner: Architectural Support for High-Performance Protocols*," http://www.hpl.hp.com/techreports/93/HPL-93-46.pdf, Jul. 1993, 18 Pages.

TRM Technologies, Inc., "*L4/L7 Switching*," Downloaded from http://www.trm.ca/pages/t-tech7.html on Feb. 16, 2006, 3 Pages.

Madsen et al., "*Wireless Data Communication*," Fall 2003 Presentation, Wireless Networks Division (WING), Allborg University.

Yocum et al., "*Anypoint: Extensible Transport Switching on the Edge*," Proceedings of the 4th USENIX Symposium on Internet Technologies and Systems, Mar. 26-28, 2003, Seattle, WA, USA.

International Search Report in PCT/US02/12679, dated Jul. 23, 2002.

Office Action in U.S. Appl. No. 10/474,500, mailed Oct. 4, 2007.
Office Action in U.S. Appl. No. 11/137,146, mailed Mar. 5, 2008.
Office Action in U.S. Appl. No. 11/137,140, mailed Feb. 5, 2008.
Office Action in U.S. Appl. No. 11/250,894, mailed Jun. 26, 2008.
Notice of Allowance in U.S. Appl. No. 10/474,500, mailed Jul. 1, 2008.
Allowed Claims from U.S. Appl. No. 10/474,500.
Office Action in U.S. Appl. No. 11/217,661, mailed Sep. 18, 2008.
Office Action in U.S. Appl. No. 11/313,003, mailed Aug. 22, 2008.
Office Action in U.S. Appl. No. 11/330,898, mailed Oct. 8, 2008.
Office Action in U.S. Appl. No. 11/137,146, mailed Nov. 3, 2008.
Office Action in U.S. Appl. No. 11/356,850 mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Office Action in U.S. Appl. No. 11/250,894 mailed Jan. 26, 2009.
Office Action in U.S. Appl. No. 11/137,140 mailed Mar. 31, 2009.
Office Action in U.S. Appl. No. 11/130,898 mailed Apr. 2, 2009.
Office Action in U.S. Appl. No. 11/747,790 mailed May 12, 2009.
Office Action in U.S. Appl. No. 11/747,793 mailed Jun. 8, 2009.
Notice of Allowance in U.S. Appl. No. 11/313,003, mailed Jun. 8, 2008.
Allowed Claims from U.S. Appl. No. 11/313,003.
Office Action in U.S. Appl. No. 11/217,661 mailed Jun. 9, 2009.
Pratt, Ian and Fraser, Keir, "Arsenic: A User-Accessible Gigabit Ethernet Interface," INFOCOM 2001. Twentieth Annual Joint Conference of the IEEE Computer and Communications Societies. Proceedings. IEEE, vol. 1, Issue , 2001 pp. 67-76 vol. 1.
Office Action in U.S. Appl. No. 11/137,146, mailed Jun. 23, 2009.
Office Action in U.S. Appl. No. 11/735,861, mailed Aug. 6, 2009.
Office Action in U.S. Appl. No. 11/137,140, mailed Aug. 21, 2009.
Office Action in U.S. Appl. No. 11/747,650, mailed Aug. 27, 2009.
Office Action in U.S. Appl. No. 11/250,894, mailed Sep. 15, 2009.
Notice of Allowance in U.S. Appl. No. 11/356,850, mailed Jun. 26, 2009.
Allowed Claims from U.S. Appl. No. 11/356,850.
Office Action in U.S. Appl. No. 11/282,933, mailed Sep. 9, 2009.
Notice of Allowance in U.S. Appl. No. 11/330,898, mailed Sep. 23, 2009.
Allowed Claims in U.S. Appl. No. 11/330,898.
Final Office Action in U.S. Appl. No. 11/747,790, mailed Nov. 5, 2009.
Notice of Allowance in U.S. Appl. No. 11/217,661 mailed Jan. 11, 2010.
Allowed Claims from U.S. Appl. No. 11/217,661.
Notice of Allowance in U.S. Appl. No. 11/282,933 mailed Dec. 31, 2009.
Allowed Claims from U.S. Appl. No. 11/282,933.
Office Action in U.S. Appl. No. 11/747,793, mailed Jan. 25, 2010.
Office Action in U.S. Appl. No. 11/735,861, mailed Jan. 25, 2010.
Office Action in U.S. Appl. No. 11/137,146, mailed Feb. 4, 2010.
Office Action in U.S. Appl. No. 11/747,790, mailed Mar. 9, 2010.
Notice of Allowance in U.S. Appl. No. 11/250,894, mailed Mar. 29, 2010.
Allowed Claims from U.S. Appl. No. 11/250,894.
Office Action in U.S. Appl. No. 11/747,650, mailed Apr. 15, 2010.
Office Action in U.S. Appl. No. 11/747,673, mailed Apr. 30, 2010.

* cited by examiner

FULL OFFLOAD OF STATEFUL CONNECTIONS, WITH PARTIAL CONNECTION OFFLOAD

RELATED APPLICATIONS

This application claims priority under 35 USC 119(e) to U.S. Provisional Patent Application No. 60/938,640, filed May 17, 2007 and entitled "FULL OFFLOAD WITH PARTIAL OFFLOAD" which is incorporated by reference herein in its entirety.

BACKGROUND

Figure 1:
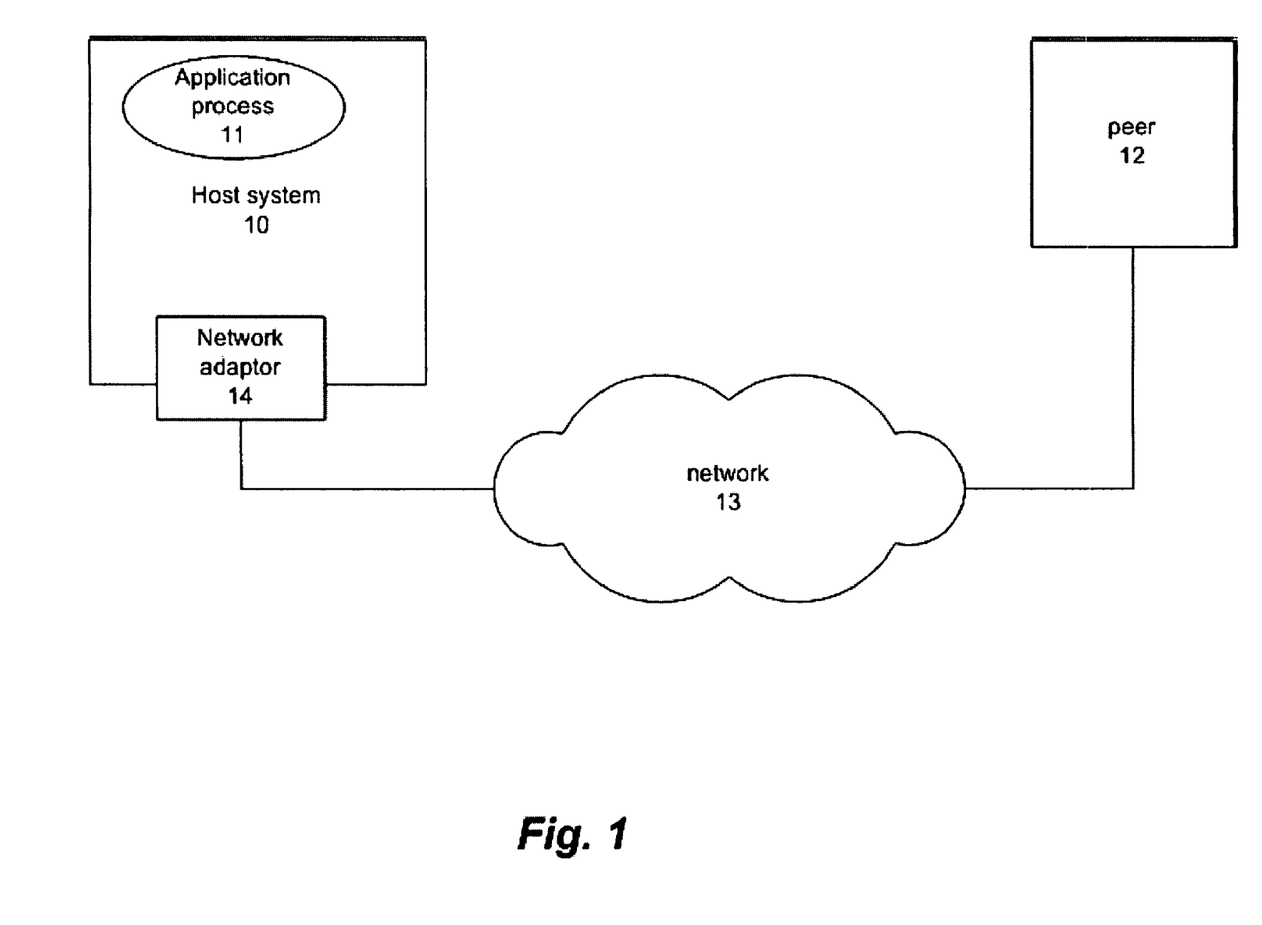
FIG. 1 illustrates an architecture of a system including a host and an offload target, configured to communicate with a peer via a stateful connection.

Protocol offload processing is known. For example, an interface device (sometimes known as intelligent network interface circuitry or an "offload target") may be provided to operate in coordination with a host, for protocol offload processing with a peer device across a network. For example, the protocol offload processing may be according to the Transmission Control Protocol (TCP) whereas communication across the network may be via high-speed Ethernet, such as 10 Gbps Ethernet. FIG. 1 illustrates an architecture of a system including a host, network interface circuitry including an offload target, and a peer configured for communication with the host according to a stateful protocol such as TCP/IP.

Furthermore, it is known that the protocol offload processing may be, for example, "partial offload" or "full offload." For example, with "full offload," the offload target handles all the phases of a connection. That is, in addition to handling the data transfer phase of a connection, the offload target is additionally at least responsible for establishing a connection, including handling retransmissions, if necessary, during connection establishment.

"Partial offload" has various flavors. Examples include the following:
- offload target handles only the data transfer phase of a connection-oriented protocol, which for example might include processing to reorder the received packets when they are received out of order.
- offload target handles only the data transfer phase and the connection teardown phase of a connection-oriented protocol.
- offload target handles the "mainstream" part of the data transfer phase, deferring exceptions, such as out of order processing, to the host system.

Partial offload solutions have been promulgated such as, for example, the "TCP Chimney" feature of recently released Vista operating system from Microsoft. Like conventional partial offload solutions, the TCP Chimney feature appears to be designed to retain full control over connection acceptance while, in addition, simplifying management of listening servers.

A listening server, for example, is used when a peer requests a connection to a local host, such as a TCP/IP connection at a specified IP address and port number. A listening server typically has an LIP, LP, FIP, and FP attribute, such that a listening server on the local host is listening for connect requests to local IP address LIP, at local port number LP, from a foreign IP address FIP, and from foreign port FP at the FIP. The FIP and FP fields for the listening server many times have "don't care values," such that connect requests are accepted from any FP on any FIP. A listening server may, in addition, have a protocol attribute such as TCP, or SCTP (Stream Control Transfer Protocol), as the SCTP protocol and other connection oriented protocols use a similar listening server mechanism to receive connect requests.

The connect request is received by the listening server that then forwards the request to a connection manager that either accepts all connect requests, or that uses various criteria such as ACL (Access Control Lists) to either accept or reject a connect request.

Figure 2:
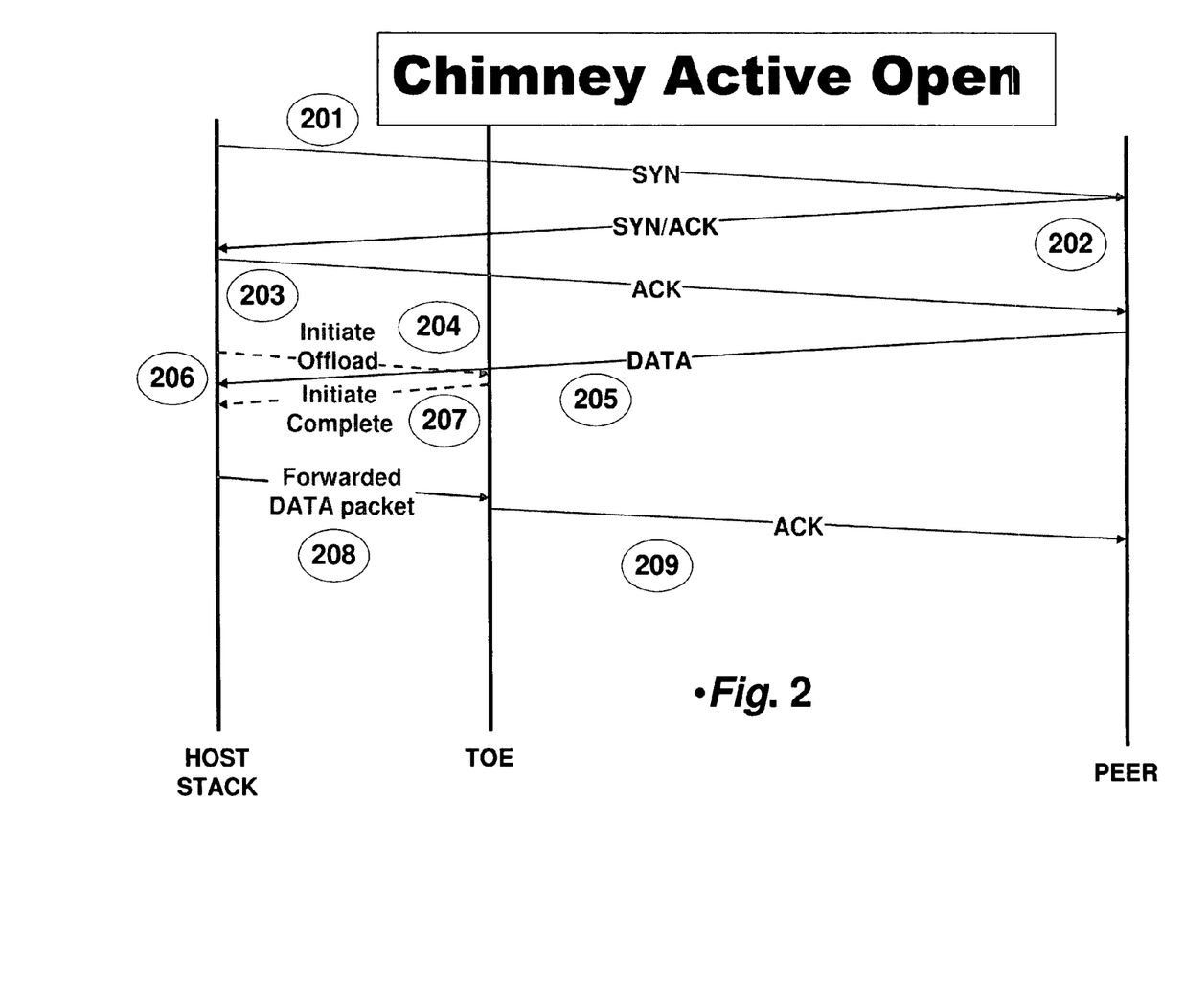
FIG. 2 illustrates an example of an "active open" operation to open a TCP/IP connection between the host and the peer, according to the TCP Chimney architecture.

FIG. 2 illustrates an example of an "active open" operation to open a TCP/IP connection between the host and the peer, according to the TCP Chimney architecture. At 201, the host stack sends an active open request to the peer via a SYN packet. At 202, the peer responds with a SYN/ACK. The host stack sends an ACK in response to the SYN/ACK. At this point, the connection has been established on the host stack.

At 204, the host stack initiates offload of the connection to the offload target. At 205, a data packet arrives from the peer after the host stack initiates the connection offload but before the connection has been set up on the offload target. The data packet is therefore sent to the host. At 206, the host stack receives the data packet. Detecting that the offload is in progress, the host stack retains the data packet.

At 207, the offloading is complete. At 208, the host stack forwards the data packet back to the offload target for processing. At 209, the offload target processes the packet and provides an acknowledgment back to the peer.

We now discuss how a control block may be configured in accordance with an example of an active open operation. An example of such a control block is shown immediately below:

```
CONST_STATE
    Flags                      = 0x0
    RemotePort                 = 0xF3FB
    LocalPort                  = 0x46B4
    SndWindScale               = 0x0
    RcvWindScale               = 0x0
    RemoteMss                  = 1460:0
CACHED_STATE
    Flags                      = 0x2
    InitialRcvWnd              = 0
    RcvIndicationSize          = 0
    KaProbeCount               = 0
    KaTimeout                  = 0x0
    KaInterval                 = 0x0
    MaxRT                      = 0x0
    FlowLabel                  = 0x0
    TtlOrHopLimit              = 0x80
    TosOrTrafficClass          = 0x0
    UserPriority               = 0x0
DELEGATED_STATE
    State                      = TcpConnectionSynSent
    Flags                      = 0x0
    RcvNxt                     = 0x0
    RcvWnd                     = 0x0
    SndUna                     = 0x0
    SndNxt                     = 0x0
    SndMax                     = 0x0
    SndWnd                     = 17520
    MaxSndWnd                  = 0x0
    SendWL1                    = 0x0
    CWnd                       = 0xB68
    SsThresh                   = 0xFFFFFFFF
    SRtt                       = 0x0
    RttVar                     = 0x1E
    TsRecent                   = 0x0
    TsRecentAge                = 0x0
    TsTime                     = 0x0
    TotalRT                    = 0x0
    DupAckCount                = 0x0
    SndWndProbeCount           = 0x0
    KeepAlive.ProbeCount       = 0x0
    KeepAlive.TimeoutDelta     = 0x0
    Retransmit.Count           = 0x0
    Retransmit.TimeoutDelta    = 0xFFFFFFFF
    SendDataHead               = 0x0
    SendDataTail               = 0x0
```

```
    SendBacklogSize        = 0x0
    Buffered Data          = 0x0
    ReceiveBacklogSize     = 0x0
```

In accordance with one example of an active open operation, a "constant state" portion of a connection control block is provided in a manner that it may otherwise be provided in a configuration that does not include an offload target. A "cached state" portion of the connection control block may be partly determined by the offload target. The delegated state portion may be partially filled in by the offload target when the connection establishment succeeds. It is noted that, prior to connection establishment succeeding, all send and receive sequence numbers are undefined and the TCP state is SYN_SENT. The offload target interprets such a control block as being for an offloaded active open.

Figure 3:
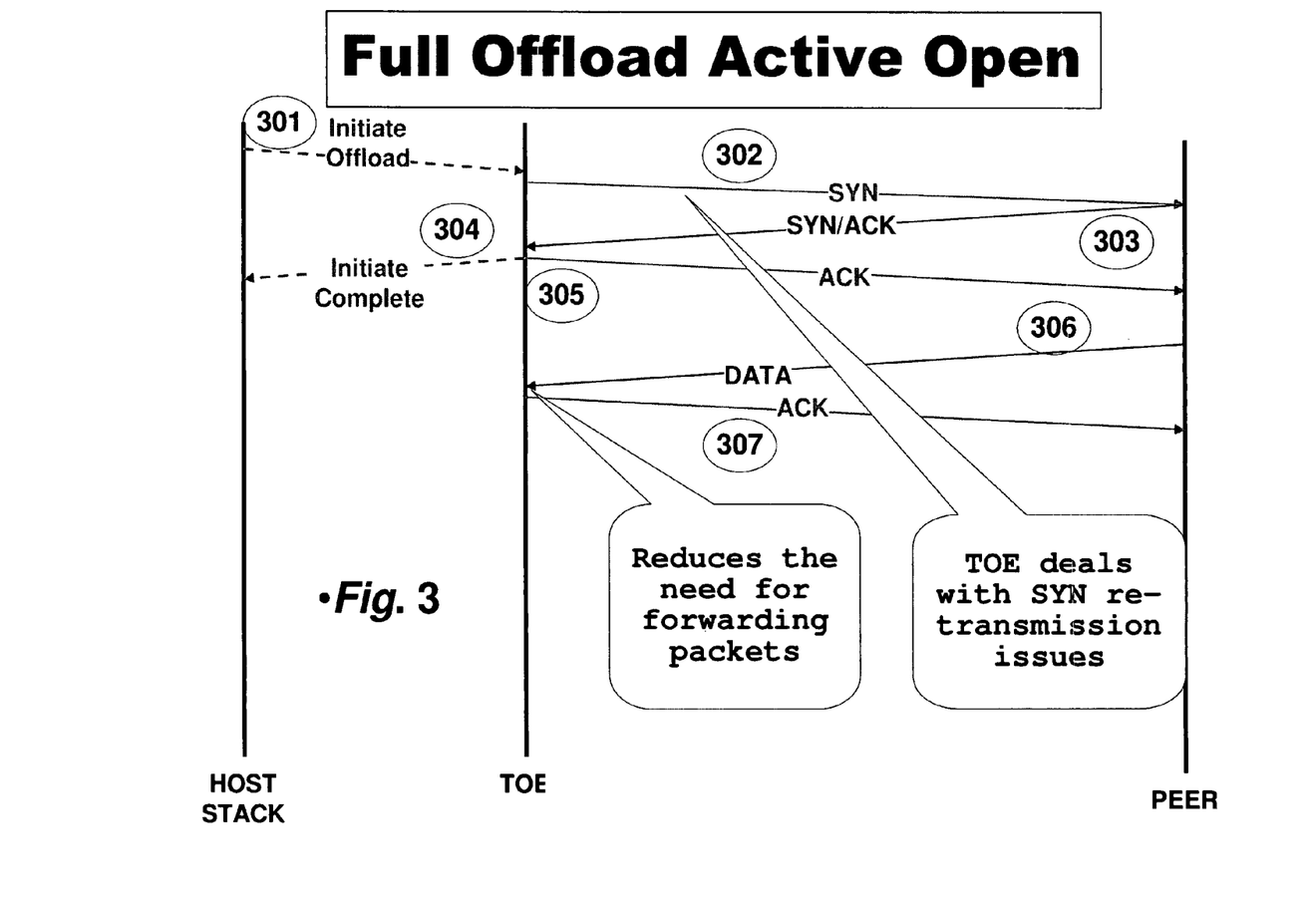
FIG. 3 illustrates an example of an active open operation, for a TCP/IP connection, being achieved in a full offload manner.

In accordance with other conventional implementations, an active open operation is achieved in a full offload manner. That is, in essence, the host requests the offload target to establish and operate a connection. FIG. 3 illustrates an example of an active open operation, for a TCP/IP connection, being achieved in a full offload manner. At 301, the host stack provides an "initiate offload" request to the offload target. The "initiate offload" request may be more generally referred to an offload event indication. At 302, the offload target provides a SYN packet to the remote peer. It is noted that the offload target handles any SYN retransmission issues, if any. At 303, the peer responds with a SYN/ACK packet. At this point, the connection is established and the connection control block is populated on the offload target. At 304, the offload target provides an "initiate complete" indication back to the host stack.

At 305, the offload target provides an ACK packet to the peer, in response to the SYN/ACK packet provided from the peer. At 306 and 307, the offload target receives a data packet (306) and acknowledges the data packet (307).

Figure 4:
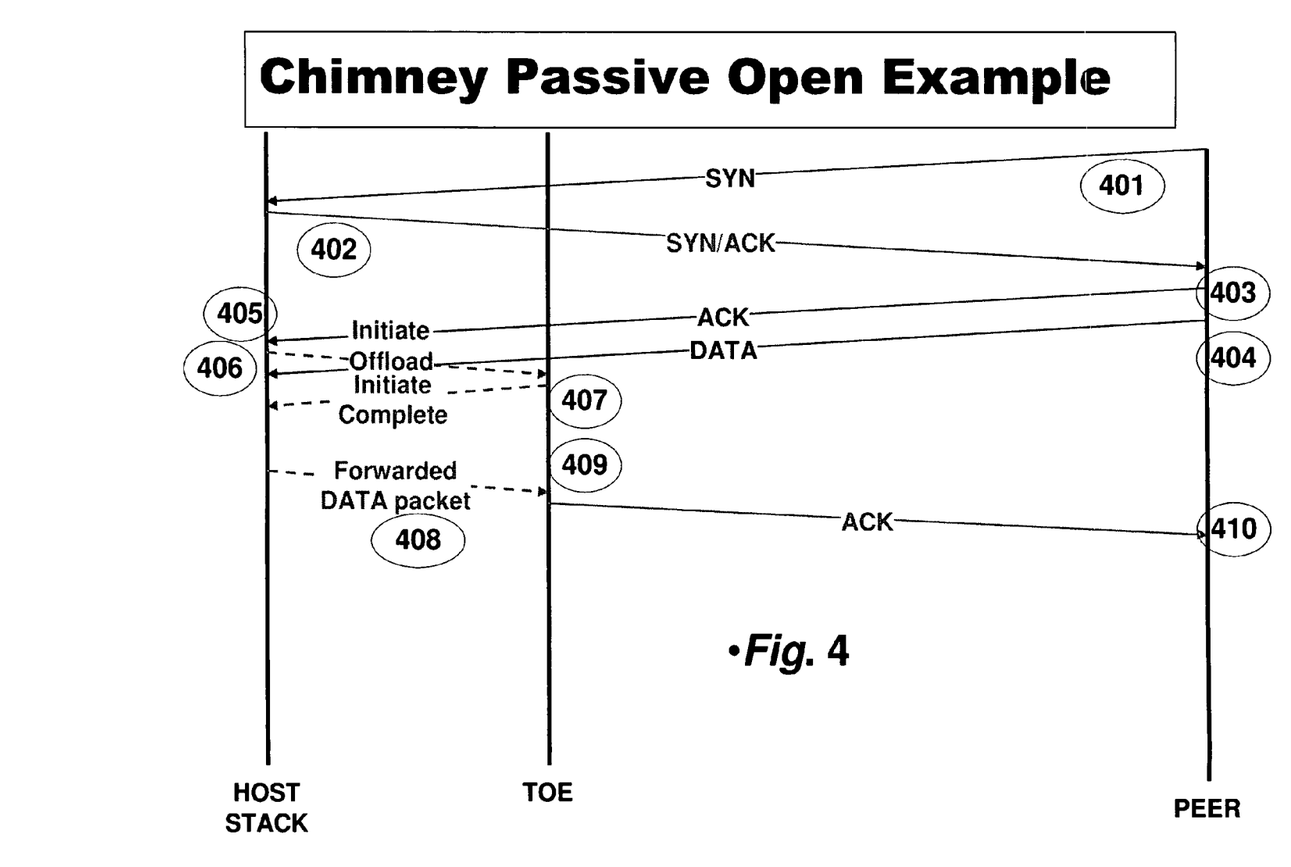
FIG. 4 illustrates an example of a partial offload "passive open" operation to open a TCP/IP connection between the host and the peer, according to the TCP Chimney architecture.

FIG. 4 illustrates an example of a partial offload "passive open" operation to open a TCP/IP connection between the host and the peer, according to the TCP Chimney architecture. At 401, the host stack receives a passive open request from the peer via a SYN packet. At 402, the host stack responds with a SYN/ACK. At 403, the peer sends an ACK in response to the SYN/ACK. At this point, the connection has been established on the host stack.

At 404, a data packet arrives from the peer. Meanwhile, at 405, the host receives the ACK and initiates a connection offload to the offload target. At 406, the host stack receives the data packet before the connection has been set up on the offload target. Detecting that the offload operation is in progress, the host stack retains the data packet. At 407, the host stack receives a message from the offload target that the offload operation is complete.

At 408, the host stack forwards the data packet to the offload target for processing. At 409, the offload target processes the data packet and sends an ACK to the peer. At 410, the peer receives the ACK corresponding to receipt of the data packet by the host.

We now discuss how a control block may be configured in accordance with an example of a partial offload passive open operation such as described relative to FIG. 4. An example of such a control block is shown immediately below:

```
    CONST_STATE
        Flags                  = 0x0
        RemotePort             = 0xF3FB
        LocalPort              = 0x46B4
        SndWindScale           = 0x0
        RcvWindScale           = 0x0
        RemoteMss              = 1460:0
    CACHED_STATE
        Flags                  = 0x2
        InitialRcvWnd          = 0
        RcvIndicationSize      = 0
        KaProbeCount           = 0
        KaTimeout              = 0x0
        KaInterval             = 0x0
        MaxRT                  = 0x0
        FlowLabel              = 0x0
        TtlOrHopLimit          = 0x80
        TosOrTrafficClass      = 0x0
        UserPriority           = 0x0
    DELEGATED_STATE
        State                  = TcpConnectionSynRcvd
        Flags                  = 0x0
        RcvNxt                 = 0xA1CD
        RcvWnd                 = 0xFFFF
        SndUna                 = 0x0
        SndNxt                 = 0x0
        SndMax                 = 0x0
        SndWnd                 = 17520
        MaxSndWnd              = 0xFFFF
        SendWL1                = 0x0
        CWnd                   = 0xB68
        SsThresh               = 0xFFFFFFFF
        SRtt                   = 0x0
        RttVar                 = 0x1E
        TsRecent               = 0x0
        TsRecentAge            = 0x0
        TsTime                 = 0x0
        TotalRT                = 0x0
        DupAckCount            = 0x0
        SndWndProbeCount       = 0x0
        KeepAlive.ProbeCount   = 0x0
        KeepAlive.TimeoutDelta = 0x0
        Retransmit.Count       = 0x0
        Retransmit.TimeoutDelta = 0xFFFFFFFF
        SendDataHead           = 0x0
        SendDataTail           = 0x0
        SendBacklogSize        = 0x0
        Buffered Data          = 0x0
        ReceiveBacklogSize     = 0x0
```

In accordance with one example of a passive open operation, a "constant state" portion of a connection control block is provided in a manner that it may otherwise be provided in a configuration that does not include an offload target. In addition, a "cached state" portion of the connection control block may also be provided in a manner that may otherwise be provided in a configuration that does not include an offload target.

The "delegated state" portion of the connection control block may be partially filled in by the offload target when the connection establishment succeeds. It is noted that, prior to connection establishment succeeding, all send and receive sequence numbers are undefined and the TCP state is SYN_RCVD. The offload target interprets such a control block as being for an offloaded passive open.

Figure 5:
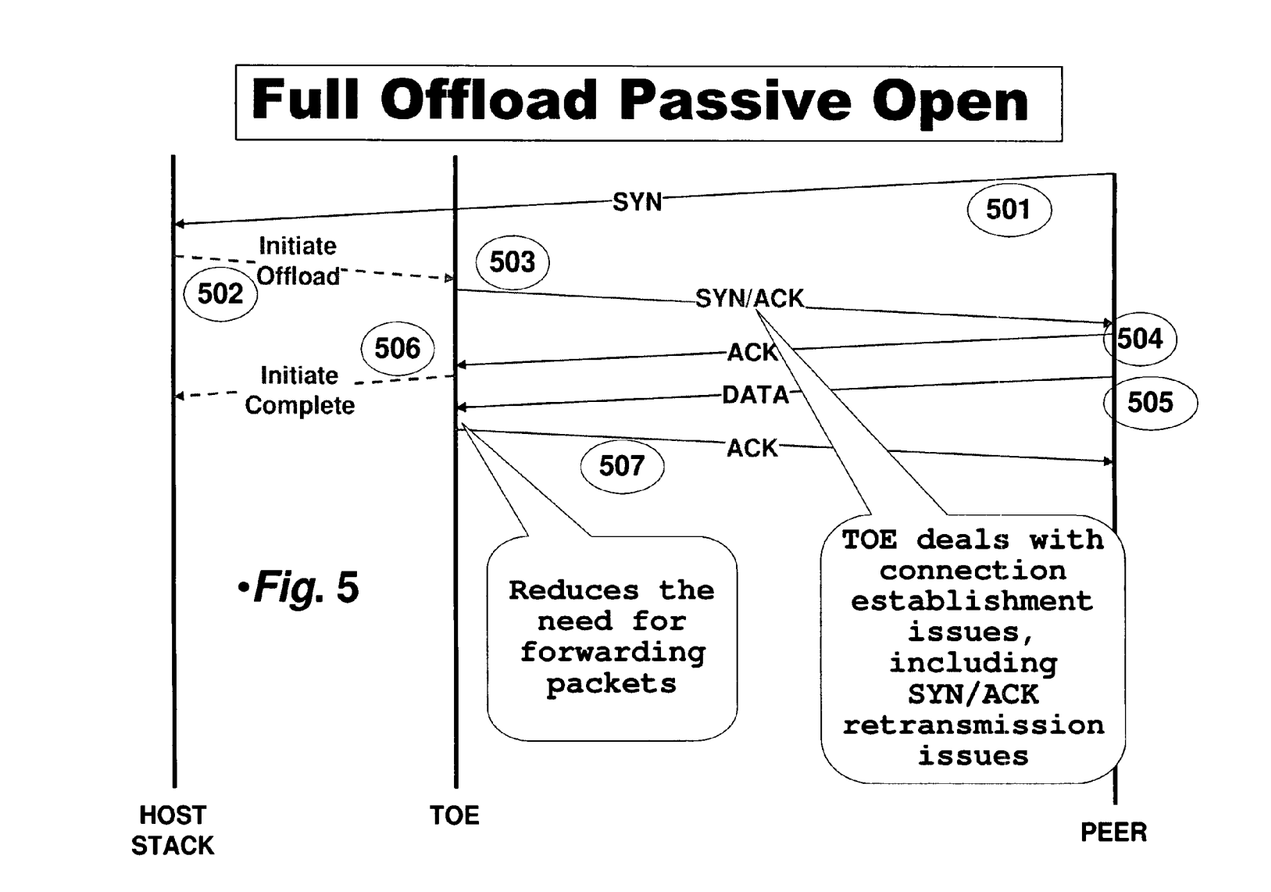
FIG. 5 illustrates an example of a full offload "passive open" operation to open a connection (in this case, a TCP/IP connection) between the host and the peer.

FIG. 5 illustrates an example of a full offload "passive open" operation to open a connection (in this case, a TCP/IP connection) between the host and the peer. At 501, the peer issues a passive open via a SYN packet. The offload target initiates a connection control block in the SYN_RCVD state and, also, provides the SYN packet to the host stack. At 502, the host stack provides an initiate offload indication to the offload target. Alternately, the indication may be an indication that the connection is not to be established.

At 503, based on the initiate offload indication, the offload target provides a SYN/ACK to the peer. Furthermore, at 503, the offload target deals with connection establishment issues such as SYN/ACK retransmission issues. At 504, the peer issues an ACK packet for the SYN/ACK packet. At 505, the peer sends a data packet. At 506, the offload target provides an "initiate complete" indication to the host stack. It is noted that the initiate complete indication may be temporally before or after the offload target receives the data packet (505). In any case, the offload target handles the data packet and, at 507, provides a corresponding ACK packet back to the peer.

SUMMARY

A method of operating a system including a host and intelligent network interface circuitry extends a passive open operation to accomplish full offload of a stateful connection between a host and a peer. In response to observing a synchronization signal from the peer, an offload target creates a connection control block in the offload target in anticipation of a corresponding stateful connection being offloaded from the host. The observed synchronization signal is allowed to be provided to the host;

In response to observing a synchronization acknowledgment signal from the host and destined for the peer, the offload target performs establishment processing for the stateful connection. Based on an acknowledgment of the synchronization acknowledgment signal from the peer, acknowledgement of the synchronization acknowledgement signal is processed and a corresponding acknowledgment signal is provided to the host.

In response to receiving an offload event indication from the host, the stateful connection is operated between the host and the peer.

DETAILED DESCRIPTION

In accordance with an aspect, a method is provided to utilize a full offload capability of an offload target to "shadow" a host that operates according to a partial offload model. The offload target accomplishes a passive open operation including "shadowing" connection establishment with the remote peer. The host retains control over connection acceptance. In addition, connection "handoff" may be simplified. In some examples, no change to the application program interface (API) for TCP offload may be required.

Figure 6:
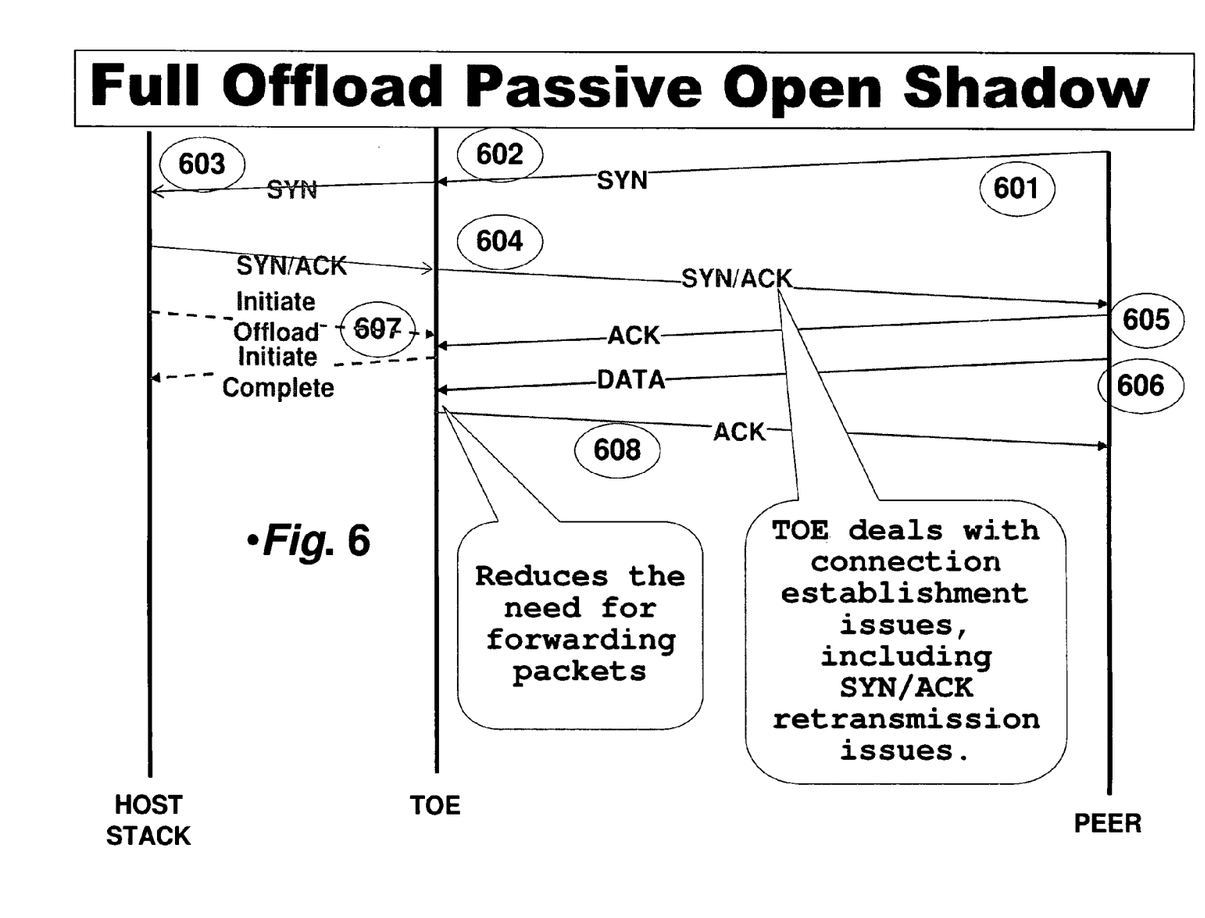
FIG. 6 illustrates an example of a method to utilize a full offload capability of an offload target to "shadow" a host that operates according to a partial offload model.

FIG. 6 illustrates one such example, for a TCP/IP connection. At 601, the peer issues a passive open via a SYN packet. At 602, the offload target observes the SYN and creates a connection control block at the offload target. This is in anticipation by the offload target of the connection being offloaded. In addition, a SYN packet is provided to the host.

At 603, the host begins connection establishment processing, responding to the provided SYN packet with a SYN/ACK packet and, for example, creating a connection control block at the offload target. At 604, the offload target detects the SYN/ACK packet from the host and performs connection establishment processing for the connection, including causing a SYN/ACK packet to be transmitted to the peer. The offload target may retransmit the SYN/ACK if necessary. At 605, the peer issues an ACK for the SYN/ACK and, at 606, the peer sends a data packet.

At 607, the host provides an "initiate offload" event to the offload target and the offload target provides an "initiate complete" event in response. In this case, a device driver in the host, for the offload target, knows that the offload target has been shadowing the connection setup process. The initiate offload event signals the offload target that it can now be in control of the connection and that the offload target can deliver to the host any data that may have been held in the offload target, including providing ACK packets to the peer as appropriate (608).

On the other hand, if the "initiate offload" event is not received by the device driver, the offload target operates under the assumption that the connection is to remain under control of the host. In this case, the data packets received by the offload target from the peer are provided to the host without maintaining the connection state in the offload target.

In the FIG. 6 example, at 602, the offload target may fetch an offloaded listening server process, if any the SYN packet received from the peer matches the LIP,LP, FIP,FP criteria of the listening server. Listening server processes (in the context of TCP/IP connections being handled by a host stack, in a non-offloaded manner) are conventionally used in some operating systems such as Linux as a coarse-grained mechanism to filter connect requests to the host stack. In particular, as is well-known, the TCP (Transmission Control Protocol) uses point to point connections to connect two communicating endpoints, with the endpoints often referred to as the local peer, and the foreign peer. The connection is typically identified by the IP (Internet Protocol) addresses of the local peer (LIP), and foreign peer (FIP), and the port number of the connection on the local peer (LP), and the port number on the foreign peer (FP). A listening server is utilized for the foreign peer to request a connect to the local peer at a specified IP address and port number. A listening server therefore has an LIP, LP, FIP, and FP attribute, such that a listening server on the local peer is listening for connect requests to local IP address LIP, at local port number LP, from a foreign IP address FIP, and from foreign port FP at the FIP. Typically the FIP and FP for the listening server have "don't care" values, i.e. accept connect requests from any FP on any FIP. A listening server in addition has a protocol attribute such as TCP, or SCTP (Stream Control Transfer Protocol), as the SCTP protocol and other connection oriented protocols use a similar listening server mechanism to receive connect requests. The connect request is received by the listening server that than forwards the request to a connection manager that either accepts all connect requests, or that uses various criteria such as ACL (Access Control Lists) to either accept or reject a connect request.

In the context of a system including an offload target, the listening server process concept has been extended to include an "offload policy" portion. Turning back to the FIG. 6 example, if the offload policy in the listening server matching the received SYN packet is set to offload, then the offload target creates the connection control block in anticipation of the connection being offloaded. If no matching listening server is found, or if one is found and the offload policy is set to "don't offload," then no connection control block is created.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of operating an offload target in a system including a host and the offload target, to extend a passive open operation to accomplish full offload of a stateful connection between the host and a peer via a network, the method comprising:
   in response to observing a synchronization signal from the peer, processing an offload listening server corresponding to the observed synchronization signal and, in accordance with a result of processing the offload listening server, creating a connection control block in anticipation of a corresponding stateful connection being offloaded from the host;
   allowing the observed synchronization signal to be provided to the host;
   in response to observing a synchronization acknowledgment signal from the host and destined for the peer and, performing establishment processing for the stateful connection;
   receiving an acknowledgment of the synchronization acknowledgment signal from the peer, processing the acknowledgement of the synchronization acknowledgement signal and providing a corresponding acknowledgment signal to the host; and
   in response to receiving an offload event indication from the host, operating the stateful connection between the host and the peer,
   the method further comprising, in response to not receiving a offload event indication from the host, not operating the stateful connection between the host and the peer, causing data packets received from the peer to be provided to the host without maintaining a connection state in the offload target.

2. The method of claim 1, wherein:
   observing a synchronization signal includes observing a TCP packet including a set SYN flag.

3. The method of claim 1, wherein:
   observing a synchronization acknowledgement signal from the host includes observing a TCP packet from the host including set SYN and ACK flags.

4. The method of claim 1, wherein:
   the stateful connection is a connection according to a TCP/IP protocol.

5. A method of operating an offload target that interfaces a host to a network for communication with a peer via a stateful connection; comprising:
   observing signals to establish a connection between the host and the peer;
   processing an offload listening server corresponding to the observed connection establishment signals and, in accordance with a result of processing the offload listening server, establishing a shadow connection between the host and peer, usable for the offload target to offload data transfer phase processing of the connection, from the host; and
   carrying out, in the offload target, data transfer phase processing of the connection,
   the method further comprising, in response to not receiving an offload event indication from the host, not carrying out, in the offload target, data transfer phase processing of the connection, causing data packets received from the peer to be provided to the host without maintaining the shadow connection in the offload target.

6. A system including a host and an offload target, configured to extend a passive open operation to accomplish full offload of a stateful connection between the host and a peer via a network, wherein the offload target is configured to:
   in response to observing a synchronization signal from the peer, process an offload listening server corresponding to the observed synchronization signal and, in accordance with a result of processing the offload listening server, create a connection control block in anticipation of a corresponding stateful connection being offloaded from the host;
   allow the observed synchronization signal to be provided to the host;
   in response to observing a synchronization acknowledgment signal from the host and destined for the peer and, performing establishment processing for the stateful connection;
   receive an acknowledgment of the synchronization acknowledgment signal from the peer, and process the acknowledgement of the synchronization acknowledgement signal and provide a corresponding acknowledgment signal to the host; and
   in response to receiving an offload event indication from the host, operate the stateful connection between the host and the peer,
   wherein the offload target is further configured to, in response to not receiving an offload event indication from the host, not operate the stateful connection between the host and the peer, cause data packets received from the peer to be provided to the host without maintaining a connection state in the intelligent network interface circuitry.

7. The system of claim 6, wherein:
   observing a synchronization signal includes observing a TCP packet including a set SYN flag.

8. The system of claim 6, wherein:
   observing a synchronization acknowledgement signal from the host includes observing a TCP packet from the host including set SYN and ACK flags.

9. The system of claim 6, wherein:
   the stateful connection is a connection according to a TCP/IP protocol.

10. An offload target that interfaces a host to a network for communication with a peer via a stateful connection; the offload target configured to:
    observe signals to establish a connection between the host and the peer;
    process an offload listening server corresponding to the observed connection establishment signals and, in accordance with a result of processing the offload listening server, establish a shadow connection between the host and peer, usable for the offload target to offload data transfer phase processing of the connection, from the host; and carry out, in the offload target, data transfer phase processing of the connection, the offload target further configured to, in response to not receiving an offload event indication from the host, not carry out, in the offload target, data transfer phase processing of the connection, and cause data packets received from the peer to be provided to the host without maintaining the shadow connection in the offload target.

11. The system of claim 10, wherein:

the offload target is further configured to carry out shutdown phase processing of the connection.

* * * * *